Dec. 18, 1945.     D. A. STARK     2,391,278

HIGH PRESSURE SHUT-OFF VALVE

Filed Dec. 30, 1943     2 Sheets-Sheet 1

Inventor
Donald A. Stark.

By Mason, Porter & Diller
Attorneys

Dec. 18, 1945.  D. A. STARK  2,391,278
HIGH PRESSURE SHUT-OFF VALVE
Filed Dec. 30, 1943  2 Sheets-Sheet 2

Inventor
Donald A. Stark.
By Mason, Porter & Diller
Attorneys

Patented Dec. 18, 1945

2,391,278

UNITED STATES PATENT OFFICE 2,391,278

HIGH PRESSURE SHUTOFF VALVE

Donald A. Stark, Willoughby Township, Lake County, Ohio, assignor to The Parker Appliance Company, Cleveland, Ohio, a corporation of Ohio Application December 30, 1943, Serial No. 516,270

9 Claims. (Cl. 251—102)

The invention relates generally to shut-off valves, and more particularly to the rotary plug type of such valves, and it primarily seeks to provide a novel valve structure of the type stated in which the rotary plug bore or flow passage is placed in a novel manner rendering possible the use of rotors and casings of smaller than conventional size for a given flow capacity, and in which novel closure seating or sealing means is included effective to adapt the valve for use in controlling high pressure lines.

An object of the invention is to provide an improved valve structure of the rotary plug type in which the plug has the fluid passage therethrough disposed off center, and in which there is included a casing bore controlled by the plug and adapted to be closed off by engagement over the casing bore of a sealing unit mounted in the solid part of the rotor disposed to one side of said off center plug passage.

Another object of the invention is to provide in a valve structure of the character stated a sealing unit removably and replaceably mounted in a receiving recess in the solid side of the rotor disposed to one side of the off center passage therethrough.

Another object of the invention is to provide in a valve structure of the character stated a rotor with an off center passage and having the external face thereof in the solid side disposed to one side of the off center passage therethrough milled to provide a rectangular recess, and a sealing unit mounted in said recess and comprising a rectangular sealing block having an aperture therethrough and a pressure disk receiving circular recess in the face thereof opposed to the rotor, a pressure disk slidably mounted in the block recess and having a thickness slightly less than the depth of the block recess, said disk and block being cooperatively formed to provide between them a pressure chamber open to fluid pressure through said aperture whereby when the rotor is turned to shut off fluid flow by engagement of the block over the casing port or passage at one side of the valve, pressure fluid from said passage side will enter the unit chamber through said aperture and act between the block and disk over the whole area of the bottom of the disk receiving recess of the block to press said block into sealing contact over said passage, and when the pressure side is at the opposite side of the rotor so turned, the pressure fluid will find its way into the sealing unit receiving recess in the rotor behind the sealing unit and act against the whole area of the block and disk assembly and press the block into sealing contact over the passage which it covers.

Another object of the invention is to provide in a valve of the character stated a rotor having a sealing unit receiving recess in its outer face, said sealing unit comprising a sealing block having an aperture therethrough and a large recess in the face thereof opposed to the rotor recess, a disk slidably mounted in the block recess and having a thickness slightly less than the depth of the block recess, said disk and block being cooperatively formed to provide between them a pressure chamber open to fluid pressure admitted through said aperture, said disk having a peripheral groove opposed to the side wall of the block recess, and a packing ring in said groove and engaging said recess side wall in pressure fluid sealing contact in any position of said disk.

With the above and other objects in view that will hereinafter appear, the nature of the invention will be more fully understood by following the detailed description, the appended claims and the several views illustrated in the accompanying drawings.

In the example of embodiment of the invention herein disclosed there is included a valve casing 5 having two ports 6 and 7 either of which may be the pressure inlet port, said ports being connected by a bore or flow passage 8.

Figure 1:
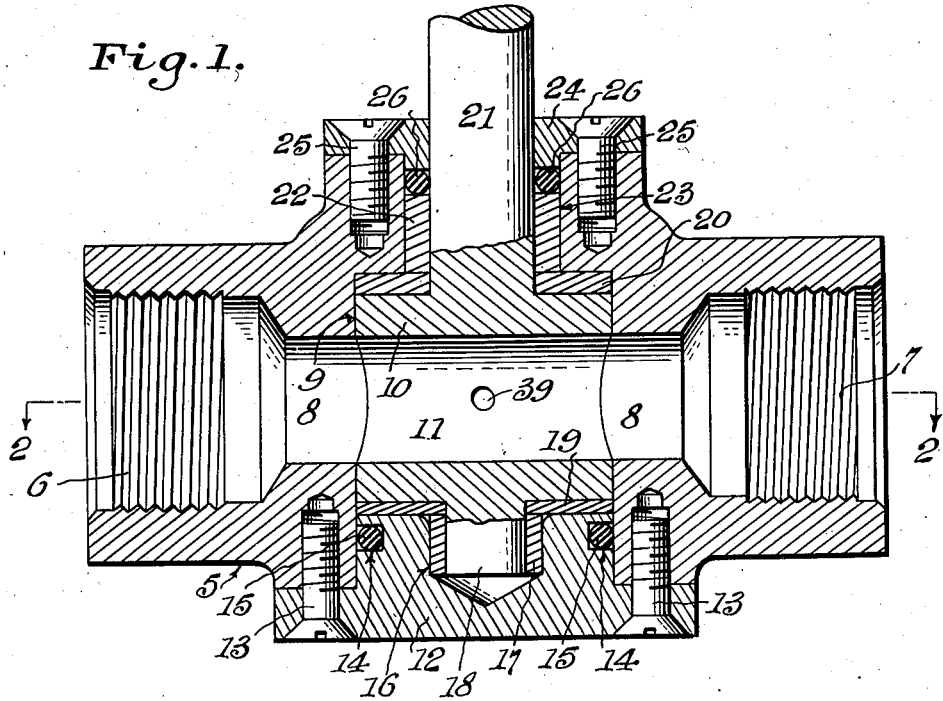
Figure 1 is a vertical longitudinal section through a valve structure embodying the invention.
Figure 2:
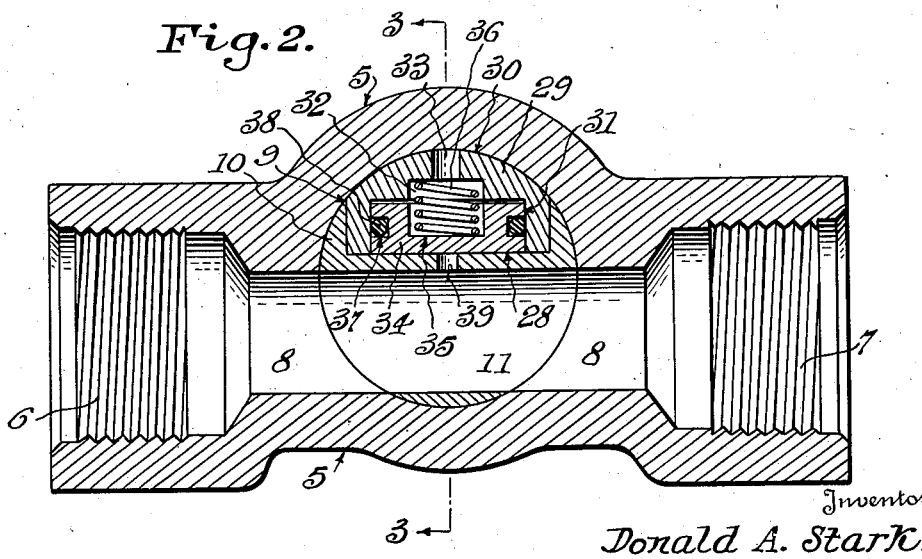
Figure 2 is a horizontal section taken on the line 2—2 on Figure 1.

Intersecting the flow passage 8 is a plug or rotor receiving bore 9 for rotatably receiving the plug or rotor 10 which in this particular disclosure is cylindrical in shape. The rotor 10 is equipped with a flow passage 11 disposed off center, as shown in Figure 2, for lining up with the casing flow passage 8. The rotor bore 9 is closed by a plug 12 which is secured to the casing by screws 13 in the manner clearly illustrated in Figure 1. The plug is equipped with an annular groove 14 wherein is mounted a packing ring 15 which engages in sealing contact with the inner wall of the bore 9. The plug 12 has a bearing bore 16 in which is mounted a bushing 17 wherein the trunnion projection 18 on the rotor 10 has rotative bearing. The end of the rotor 10 rotates against a bearing ring 19 which is interposed between the plug 12 and the adjacent end of said rotor. The rotor 10 also rotates against a bearing ring 20 at its other end at which it is equipped with an actuator stem 21. The stem 21 rotates in a bushing 22 mounted in a stem bore 23 formed in the casing 5, and the stem projects through a closure ring 24 which is secured by screws 25 to said casing in the manner clearly illustrated in Figure 1. A packing ring 26 is interposed between the ring 24 and the end of the bushing 22, and this ring cooperates with the previously mentioned packing ring 15 in sealing the valve casing against leakage about the rotor.

Figure 3:
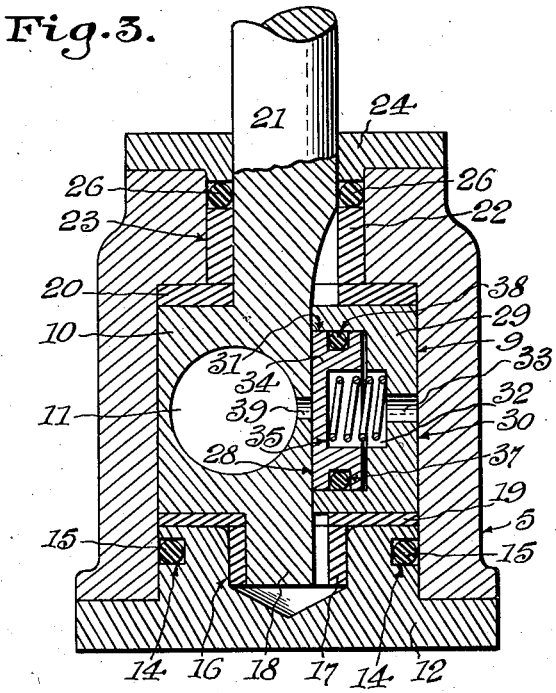
Figure 3 is a vertical cross section taken on the line 3—3 on Figure 2.
Figure 6:
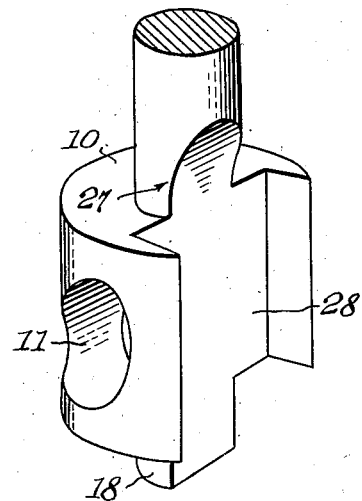
Figure 6 is a detail fragmentary perspective view illustrating the valve plug or rotor.

It will be obvious by referring to Figures 2, 3 and 6 of the drawings that the solid part of the rotor 10 disposed to one side of the flow passage 11 is milled out as at 27, in the manner best illustrated in Figure 6, to provide a rectangular recess 28 for removably and replaceably receiving a valve passage sealing unit. The sealing unit is clearly illustrated in Figures 2 to 5 and comprises a rectangular block 29 having an outwardly replaceably curved outer face 30 conforming to the shape of the inner wall of the casing bore 9, said block having a circular disk receiving recess 31 formed therein and being counterbored to provide a pressure chamber 32 and equipped with an aperture 33 extending through the curved face 30 and communicating with said pressure chamber. A disk 34 is slidably mounted in the block recess 31, and it will be observed by reference to Figures 4 and 5 that this disk is of a thickness slightly less than the depth of the recess 31. The disk opening is provided with a recess 35 forming a continuation of the pressure chamber 32. Thus the block and disk are cooperatively formed to provide a pressure chamber between them. If desired, a compression spring may be interposed in the pressure chamber so as to constantly tend to place the disk 34 in the position illustrated in Figure 4 wherein it is slightly spaced from the bottom of the block recess 31 in which it is mounted. An annular groove 37 is provided in the periphery of the disk 34 and a packing ring 38 is mounted in said groove and is effective to seal against leakage between the disk and the block regardless of the position of the disk in said block. If desired, an aperture 39 may be provided through the wall of the rotor passage 11 into the sealing unit receiving recess 28.

Figure 4:
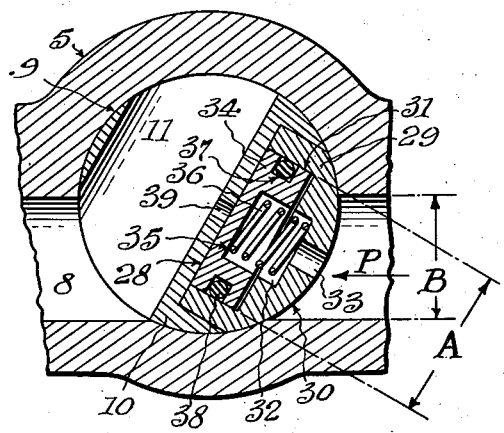
Figures 4 and 5 are fragmentary horizontal sectional views illustrating the valve rotor as turned in to position for closing the flow passage through the valve casing, the respective views illustrating the condition of the sealing unit with the pressure fluid flowing in opposite directions, to the left as viewed in Figure 4, and to the right as viewed in Figure 5.

In Figure 4 the valve rotor is turned into position for placing the sealing unit in a shut-off position wherein it is in sealing engagement over the passage at the right hand side of the casing as viewed in said figure. In this illustration the pressure inlet is to be considered as disposed toward the right and that the pressure fluid is directed against the rotor in the direction of the arrow P. In this condition of the parts the pressure fluid will enter the sealing block aperture 33 and will engage the bottom of the disk receiving recess 31 so as to exert pressure throughout the area designated A tending to seat the block 29 in sealing contact with the rotor bore over the casing flow passage 11. The pressure sealing effect will equal a minus B, B being the diameter of the sealed flow passage.

Figure 5:
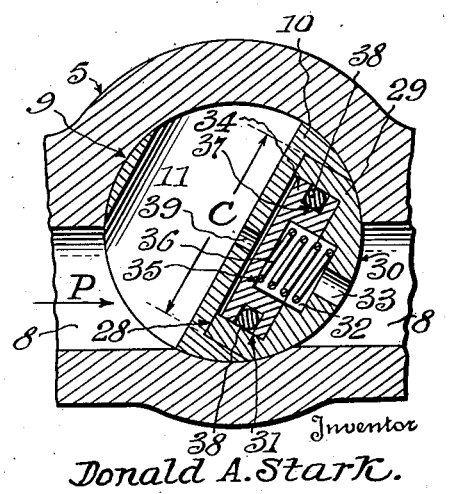

In Figure 5 the parts are positioned and conditioned as though the pressure inlet port were disposed toward the left so that the pressure fluid would be directed as shown by arrow P. In this position and condition of the parts the pressure fluid would leak around the rotor and into the milled recess 28 beneath the composite sealing unit in the recess and would act against the whole unit area C to seat the block 29 in sealing contact with the rotor bore over the casing flow passage 11. When the aperture 39 is provided, the pressure will of course act directly through said aperture against the area C of the composite sealing unit.

An outstanding advantage of forming the valve structure in the manner hereinabove described with the rotor and casing equipped with opposite flow passages is that for a particular size of bore or passage 11, the cylindrical bore or flow passage 8 of the casing can be made smaller than if the bore 11 in the rotor is extended centrally therethrough. This makes it possible to reduce the size and weight of the valve structure and results in a considerable saving in material. Another advantage is that a smaller rotor can be provided, and obviously a smaller rotor will turn easier than a large one because of the smaller surface area in engagement with the casing bore. In other words, the force resisting turning of the rotor within the casing operates through a shorter lever arm in the small rotor than in a large rotor, thus making it easier to turn the small rotor.

It is to be understood that the details of construction of the cooperating parts can be variously changed without departing from the spirit and scope of the invention, as defined in the appended claims.

What is claimed is:

1. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit removably and replaceably mounted in said recess and turnable with the rotor for engaging over and sealing the casing flow passage, and means for admitting pressure fluid from the shut off casing flow passage to engage with said sealing member and press it in tight sealing contact when turned to engage over the casing flow passage.

2. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit mounted in said recess and free to move radially therein and having a chamber therein and a radial aperture opening through its outer surface into said chamber and said chamber having an outwardly directed surface area larger than the cross section of the casing flow passage so that pressure fluid entering through said aperture when the sealing unit is presented over the casing flow passage will act against said chamber surface to press the unit in sealing contact over said casing flow passage.

3. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit removably and replaceably mounted in said recess and turnable with the rotor for engaging over and sealing the casing flow passage, and means for admitting pressure fluid from either end of the shut off casing flow passage to engage with said sealing member and press it in tight sealing contact when turned to engage over the casing flow passage.

4. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit mounted in said recess and comprising a block free to move radially in said recess and having an outer surface conforming in shape to and engaging said bore and an inner surface equipped with a recess, a disk mounted for limited radial movement in the block recess, said block having an aperture extending through its outer face and communicating with the block recess between the block and the disk and effective to admit fluid under pressure between the block and disk to press the block in sealing contact with said bore at the position of the casing passage.

5. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit mounted in said recess and comprising a block free to move radially in said recess and having an outer surface conforming in shape to and engaging said bore and an inner surface equipped with a recess, a disk mounted for limited radial movement in the block recess, said block having an aperture extending through its outer face and communicating with the block recess between the block and the disk and effective to admit fluid under pressure between the block and disk to press the block in sealing contact with said bore at the position of the casing passage, said disk being slightly less in thickness than the depth of said block recess, and there being included a compression spring mounted between the disk and block and constantly urging the disk away from the bottom of the block recess to make of the whole bottom of said block recess a pressure area against which to exert pressure effective to move the block into said sealing contact.

6. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit mounted in said recess and comprising a block free to move radially in said recess and having an outer surface conforming in shape to and engaging said bore and an inner surface equipped with a recess, a disk mounted for limited radial movement in the block recess, said block having an aperture extending through its outer face and communicating with the block recesses between the block and the disk and effective to admit fluid under pressure between the block and disk to press the block in sealing contact with said bore at the position of the casing passage, said disk being slightly less in thickness than the depth of said block recess and having an annular groove in the periphery thereof, and a packing ring in said groove for sealing the disk against pressure leakage therepast regardless of the position of said disk.

7. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit mounted in said recess and comprising a block free to move radially in said recess and having an outer surface conforming in shape to and engaging said bore and an inner surface equipped with a recess, a disk mounted for limited radial movement in the block recess, said block having an aperture extending through its outer face and communicating with the block recesses between the block and the disk and effective to admit fluid under pressure between the block and disk to press the block in sealing contact with said bore at the position of the casing passage, said disk being slightly less in thickness than the depth of said block recess and having an annular groove in the periphery thereof, and a packing ring in said groove for sealing the disk against pressure leakage therepast regardless of the position of said disk, and a compression spring mounted between the disk and block and constantly urging the disk away from the bottom of the block recess to make of the whole bottom of said block recess a pressure area against which to exert pressure effective to move the block into said sealing contact.

8. A valve structure comprising a casing having a flow passage therethrough and a rotor bearing bore intersecting said passage in off center relation, a rotor mounted in said bore and having a flow passage therethrough disposed to one side of the axis of the rotor in position for being turnable into alignment with said passage, said rotor having a recess in the solid part thereof disposed to one side of its off center flow passage, a sealing unit mounted in said recess and comprising a block free to move radially in said recess and having an outer surface conforming in shape to and engaging said bore and an inner surface equipped with a recess, a disk mounted for limited radial movement in the block recess, said block having an aperture extending through its outer face and communicating with the block recesses between the block and the disk, whereby pressure fluid from one direction admitted through said aperture will act against said whole bottom of the block recess to press the block into said sealing contact, or pressure fluid from the opposite direction will find its way into the rotor recess behind the sealing unit and act upon the combined area of the block and the disk in the recess therein to press said block into said sealing contact.

9. In a valve, a rotor having a recess in its external bore opposing passage controlling surface into which fluid pressure from one direction can leak, and a passage sealing unit comprising, a block free to move radially in said recess and having an outer surface conforming to the shape of the outer surface of the rotor and an inner surface equipped with a recess, a disk mounted in the block recess and of a thickness slightly less than the depth of the block recess, said block and disk being cooperatively formed to provide between them a pressure chamber and said block having an aperture through its outer surface communicating with said chamber, a spring in said chamber constantly tending to slightly separate the disk from the bottom of the block recess, said disk having an annular groove in the periphery thereof, and a packing ring in said groove for sealing the disk against pressure leakage therepast regardless of the position of said disk.

DONALD A. STARK.